Figure 1:
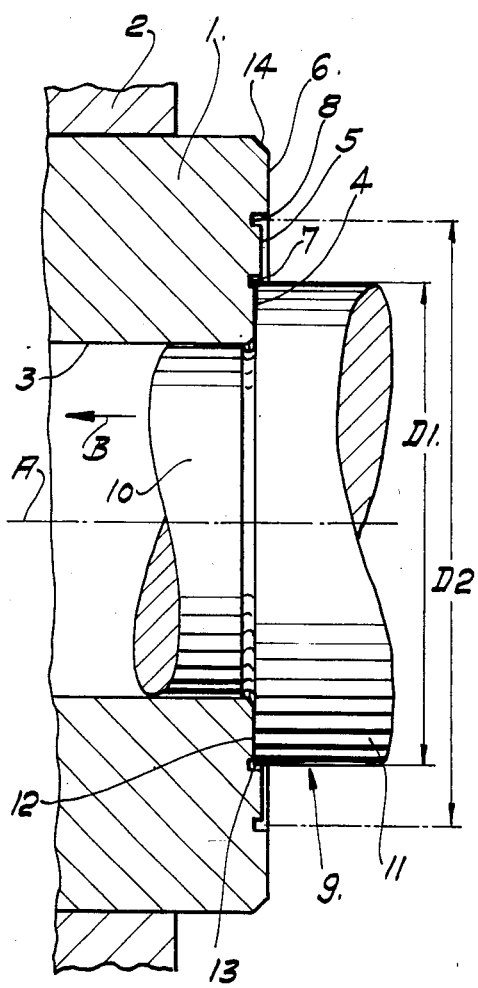

United States Patent [19]

Eckle

[11] Patent Number: 4,678,382

[45] Date of Patent: Jul. 7, 1987

[54] MACHINE TOOL SPINDLE AND TOOL HOLDERS SUITABLE FOR USE THEREWITH

[75] Inventor: Otto Eckle, Loechgau, Fed. Rep. of Germany

[73] Assignee: Komet Stahlhalter- und Werkzeugfabrik Robert Breuning GmbH, Besigheim, Fed. Rep. of Germany

[21] Appl. No.: 875,852

[22] Filed: Jun. 18, 1986

[30] Foreign Application Priority Data

Jul. 9, 1985 [DE] Fed. Rep. of Germany ... 8519794[U]

[51] Int. Cl.[4] ............................ B23C 5/26; B23Q 3/12
[52] U.S. Cl. ................................. 409/232; 408/239 R
[58] Field of Search ............... 409/230, 231, 232, 233, 409/234; 408/239, 239 A, 240

[56] References Cited

U.S. PATENT DOCUMENTS 3,136,217 6/1964 Swanson et al. .................. 409/233
3,138,997 6/1964 Bruckner ........................... 409/233
4,061,076 12/1977 Robertson .......................... 409/232

Primary Examiner—Z. R. Bilinsky
Attorney, Agent, or Firm—Flynn, Thiel, Boutell & Tanis

[57] ABSTRACT

The machine tool spindle has a cylindrical receiving bore (3) and on its front end a plurality of concentric, annular supporting surfaces (4, 5, 6) which are separated from one another by annular grooves (7, 8) formed in the front end. The tool holders (9a) have mating projections (10) of equal diameter which fit accurately in the receiving bore (3) but shank diameters (D3) which differ stepwise from one another, the outside diameter (d1, d2, d3) of each supporting surface (4, 5, 6) being slightly smaller than the outside diameter (D3) of the annular surface (12a) of the corresponding tool holder (9a). When the annular surface (12a) (of a tool holder 9a), which is located at the transition between the shank and the mating projection (10), is in contact with the corresponding supporting surface (4, 5, 6), the or each further radially inwardly located supporting surface is located in axially spaced relationship to the opposite radial surface of the tool holder (9a).

6 Claims, 4 Drawing Figures

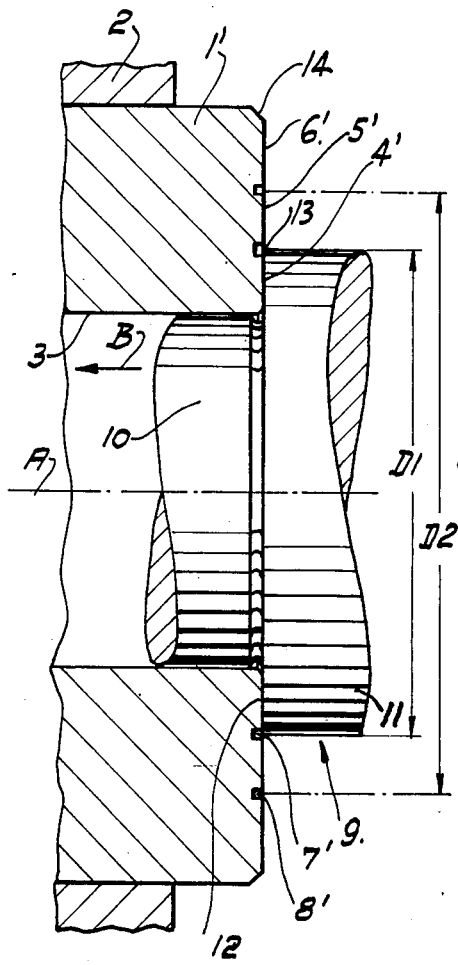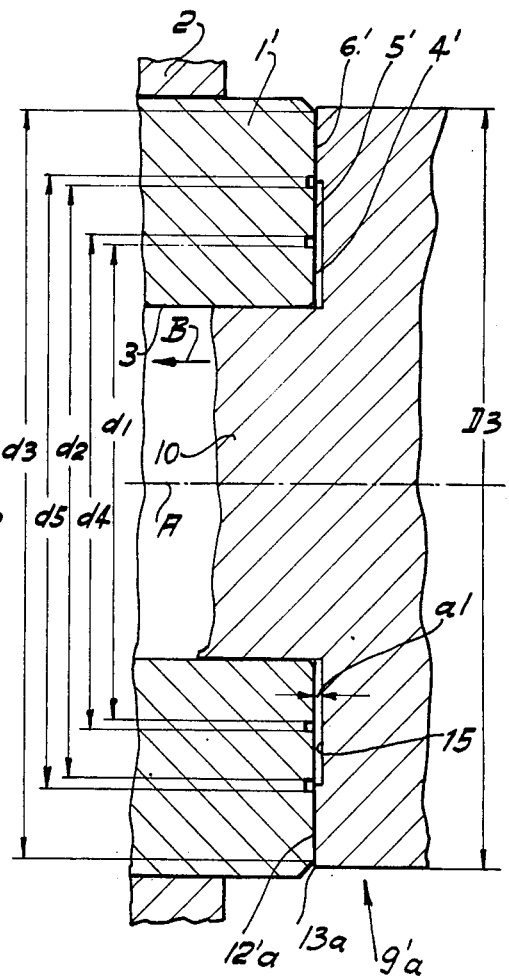

MACHINE TOOL SPINDLE AND TOOL HOLDERS SUITABLE FOR USE THEREWITH

The invention relates to a machine tool spindle and tool holders suitable for use therewith, which spindle has a cylindrical receiving bore in its face end part and at least one annular supporting surface surrounding the receiving bore, disposed at right angles to the axis of the spindle and located at the front end of the latter, in which a tool holder capable of being inserted in the spindle has a cylindrical mating projection which fits accurately in the receiving bore, a cylindrical shank adjacent the mating projection and coaxial therewith, which shank is of larger diameter than the mating projection, and an annular surface located at the transition between the shank and the mating projection, arranged concentrically with the latter and extending at right angles to the axis of the shank, which annular surface, after insertion of the mating projection in the receiving bore, abuts against the annular supporting surface.

In a known machine tool spindle (EP-A 0 123 220) of this kind the supporting surface extends uninterruptedly from the receiving bore to the outside diameter of the spindle. The shank of the tool holder is of approximately the same diameter as the spindle. Also, the annular surface extends from the mating projection as far as the outside diameter of the shank of the tool holder. Thus, the tool holder is supported against the spindle over a very large diameter, so that an optimum support is obtained. This optimum support is advantageous in the case of tools which require a large constant torque and a large cutting torque, such as milling heads or large diameter boring tools. If tools are provided which are subjected to relatively small loads, such as small diameter drilling bits, reaming bits and small diameter screw-thread-cutting tools and also have a shank the outside diameter of which corresponds to that of spindle, then these tools are likewise very robust, but are unnecessarily heavy. Owing to their substantial size, the time required for changing these tools with automatic tool changing is increased and above all tools with a large shank diameter take-up a great deal of space in a tool magazine. If tools which are subjected to relatively small loads are provided with a shank of relatively small diameter, there is then the danger of the outer edge of the shank at the transition from the annular surface to the outer surface of the shank producing deformations of the supporting surface. These deformations can occur on one side, i.e. on the side which is diameterically opposite the tool. The deformations or markings result in a tool having a relatively large diameter shank no longer bearing in overall surface contact against the supporting surface, and especially not in the region of the outside diameter of the latter. This leads not only to a reduction of stability, but also to machining inaccuracies. In many cases, the tools are of course pre-inserted outside the machine. If, in the case of such a pre-inserted tool, the annular surface does not lie in overall surface-to-surface contact against the supporting surface, the cutting edge of the tool will then be located at a greater distance from the supporting surface and the amount of machining carried out will also thereby be varied.

The basic object of the invention is accordingly to provide a machine tool spindle and a tool holder for use therewith in which the shank can have an outside diameter which is suitable for the loads applied to the tool at any given time and in which a reliable support of the annular surface of each tool holder in the region of the outside diameter of the said annular surface is nevertheless ensured.

This object is achieved according to the invention in that a plurality of annular supporting surfaces which are concentric with one another are formed on the front end of the spindle, which supporting surfaces are separated from one another by annular grooves formed in the front end surface and that the shanks of the tool holders, in cases where the mating projections are of equal diameter, have diameters which differ stepwise from one another, the outside diameter of each supporting surface being slightly smaller than that of the annular surface of the correspnding tool holder and furthermore the or each radially further inwardly located surface being arranged so that it is axially spaced from the opposite radial surface of the tool holder when the annular surface of a tool holder is in contact with the corresponding supporting surface.

As a result of the subdivision of the front end surface of the spindle into individual supporting surfaces which are concentric with one another and are separated by annular grooves, deformations (markings) produced by the outer edge located at the transition from the shank to the annular surface are avoided. This outer edge is of course located in each case in the region of an annular groove and cannot therefore press against the supporting surface. Furthermore, the shank of each tool holder is constantly supported by its annular surface against the oppositely located supporting surface only in the region of its outside diameter. A reliable support, as well as an accurate fit of the tool holder against one of the supporting surfaces, i.e. against the supporting surface which is of the largest possible area in relation to the diameter of the shank, is entered at all times. A reliable transmission of power from the tool holder to the spindle and vice versa is always ensured, as well as an accurate positioning of a pre-inserted cutting tool with respect to the corresponding supporting surface of the spindle.

Advantageous developments of the invention are defined in the sub-claims.

Figure 2:
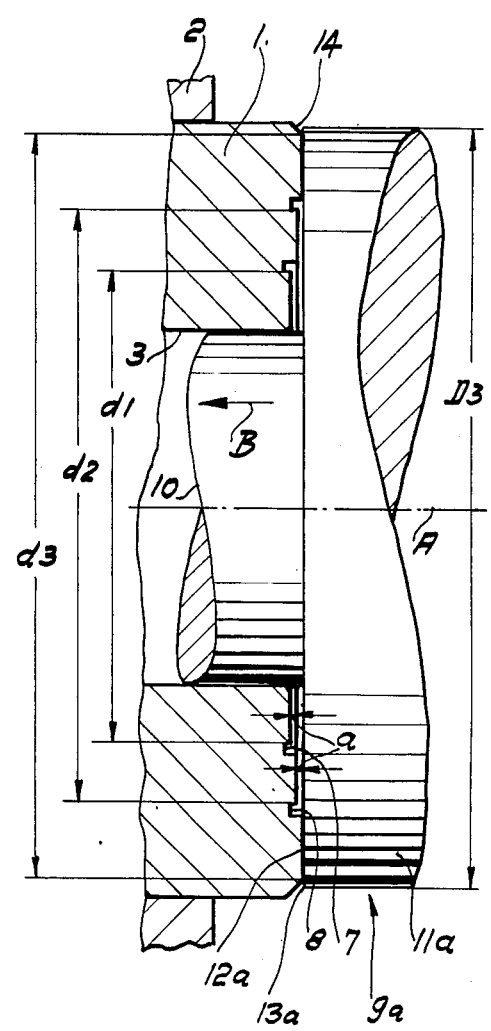

The invention is explained in greater detail below with reference to constructional embodiments shown in the drawings, in which:

FIG. 1 shows a first constructional embodiment with a tool holder having a small diameter shank, FIG. 2 shows the same constructional embodiment with a tool holder having a large diameter shank, FIG. 3 shows a second constructional embodiment with a tool holder having a small diameter shank, and FIG. 4 shows this constructional embodiment with a tool holder having a large diameter shank.

The spindle 1 is rotatably mounted in a headstock 2. It has a cylindrical receiving bore 3. One of the front end of the spindle 1 there are provided three concentric supporting surfaces 4, 5, 6 which are separated from one another by annular grooves 7, 8. The annular grooves 7, 8 may have a radial width of for example 2 mm. In the constructional embodiment shown in FIGS. 1, and 2, the supporting surfaces 4 to 6 are furthermore arranged in offset relationship to one another, i.e. so that in each case the more inwardly located supporting surface, e.g. the supporting surface 4 is located in an axially set back position with respect to the supporting surface 5 surrounding it. The supporting surface 5 is in turn arranged in an axially set back position with respect to the supporting surface 6. The axial distance a between each two supporting surfaces is shown exaggeratedly large in the drawings for the sake of clarity. In practice, it would amount to at least about 03/802 mm.

The tool holder 9 has a mating projection 10 which fits accurately in the receiving bore 3 and a coaxial cylindrical shank 11 adjoining the said mating projection. At the front end of the shank 11 there is arranged a tool (not shown), for example a remaining bit, a small diameter drill or a screw-threading tool. At the transition between the mating projection 10 and the shank 11 there is provided an annular surface 12 which is concentric with the axis A of the shank and extends at right angles to the said axis A. Clamping means (not shown) are provided in the spindle 1 which engage the mating projection 10 and urge it in the direction B into the interior of the spindle and thereby press the annular surface 12 against the supporting surface 4. Such clamping means are disclosed, for example, in EP-A 0 123 220.

In FIG. 2 the same spindle 1 is shown with a different tool holder 9a which carries at the free end of its shank 11a a tool (not shown), for example a milling cutter head, which is subjected to substantial working forces. The shank 11a consequently has the largest possible diameter D3. As a result of the stepwise offsetting of the supporting surfaces 4, 5, 6 it is only in the region of its diameter D3 that the shank 11a is located with its supporting surface 12a in contact with the supporting surface 6 which has the largest outside diameter d3. A further tool holder, which as indicated only in chain-dotted lines in FIG. 1, may have a diameter D2 intermediate between the diameters D1 and D3. In each case, the diameters D1, D2, D3 of the several different tool holders must be so graduated that outside diameters d1, d2, d3 of the supporting surfaces 4, 5, 6 are always slightly, i.e. about 1 mm, smaller than the shank diameters D1, D2, D3 of the corresponding tool holders 9, 9a. Thus, the outer edge 13,13a at the transition between the shank 11, 11a and the annular surface 12, 12a is always located in the region of one of the annular grooves 7 or 8 or of the chamfer 14. Thus, the outer edge 13,13a never passes against one of the supporting surfaces 4, 5, 6 and deformations (markings) of the supporting surfaces are consequently avoided.

The same also holds good for the embodiment shown in FIGS. 3 and 4. In this embodiment the same references are used as in the previous embodiment, an index mark being added in the case of each of those parts which differ constructionally from the corresponding parts in the previous embodiment. The above description is however also applicable mutates mutandis to the embodiment shown in FIGS. 3 and 4. The supporting surfaces 4', 5', 6' which are separated from one another by the grooves 7', 8' are located in this embodiment in one and the same plane which has the advantage that the front end surface of the spindle 1' can be ground in a single working operation. The tool holder 9 corresponds in all details to the tool holder shown in FIG. 1. In order, however, in the case of tool holders 9'a having a large diameter D3, to ensure likewise that this tool holder 9'a will always be located with its annular surface 12'a in contact solely with the corresponding outer supporting surface 6', the tool holder 9'a has a turned recess which is concentric with the mating projection 10. This turned recess is so dimensioned that the radial surface 15 of the tool holder 9'a, which radial surface is located within the inside diameter d5 of the corresponding supporting surface 6' and extends inwardly as far as the mating projection 10, is set back with respect to the annular surface 12'a in the direction towards the tool-carrying end of the tool holder 9'a. In a tool holder which is indicated in chain-dotted lines in FIG. 3 and which has a shank diameter D2, the turned recess has an outside diameter which is somewhat smaller than the inside diameter d4 of the supporting surface 5'. Thus, the radial surface 15 has an axial spacing a1 from the annular surface 12'a and accordingly also an axial spacing from the further inwardly located supporting surfaces 4' and 5'. The axial spacing a1 of the radial surface 15 from the annular surface 12'a should amount to at least approximately 0.02 mm.

The embodiments of the invention in which an exclusive property or privilege is claimed are defined as follows:

1. In a machine tool spindle and tool holders suitable for use therewith, which spindle has a cylindrical bore in its free end part and at least one annular supporting surface surrounding the receiving bore, disposed at right angles to the axis of the spindle and located at the front end of the latter, in which a tool holder capable of being inserted in the spindle has a cylindrical mating projection which fits accurately in the receiving bore, a cylindrical shank adjacent the mating projection and coaxial therewith, which shank is of larger diameter than the mating projection, and an annular surface located at the transition between the shank and the mating projection, arranged concentrically with the latter and extending at right angles to the axis of the shank, which annular surface after insertion of the mating projection in the receiving bore, abuts against the annular supporting surface, the improvement comprising wherein a plurality of annular supporting surfaces which are concentric with one another are formed on the front end of the spindle, which supporting surfaces are separated from one another by annular grooves formed in the front end surface and wherein the shanks of the tool holders, in cases where the mating projections are of equal diameter, have diameters which differ stepwise from one another, the outside diameter of each supporting surface being slightly smaller than the outside diameter of the annular surface of the corresponding tool holder and furthermore the radially further inwardly located supporting surface being arranged so that it is axially spaced from the opposite radial surface of the tool holder when the annular surface of a tool holder is in contact with the corresponding supporting surface.

2. The machine tool spindle according to claim 1, wherein in each case the inwardly located supporting surface is located in an axially set back position with respect to one of the supporting surfaces which surround it.

3. The machine tool spindle according to claim 2, wherein the axial spacing between two of the supporting surfaces is approximately 0.02 mm.

4. The machine tool spindle according to claim 1, wherein the annular surface extends radially inwardly from the shank diameter as far as the corresponding supporting surface and that the radial surface of the tool holder which radial surface is located within the inside diameter of the corresponding supporting surface is set back from the annular surface in the direction towards the tool-carrying end of the tool holder.

5. The machine tool spindle according to claim 4, wherein the axial distance of the radial surface from the annular surface is at least 0.02 mm.

6. The machine tool spindle according to claim 1, wherein the radial width of the annular groove is approximately 2 mm.

* * * * *